UNITED STATES PATENT OFFICE.

LUDWIG HEINRICH FRIEDBURG, OF NEW YORK, N. Y., ASSIGNOR, BY MESNE ASSIGNMENTS, OF ONE-HALF TO THE UNITED STATES COTTON SEED CLEANING COMPANY, OF SAME PLACE.

EXTRACTION OF OILS.

SPECIFICATION forming part of Letters Patent No. 306,733, dated October 21, 1884.

Application filed March 1, 1884. (No specimens.)

*To all whom it may concern:*

Be it known that I, LUDWIG H. FRIEDBURG, of New York, in the county of New York and State of New York, have invented a new and useful Improvement in Extraction of Oils; and I do hereby declare that the following is a full, clear, and exact description of the same.

My invention relates to the extraction of oils and fats, and is particularly adapted to the extraction of cotton-seed oil.

Heretofore, as is well known, naphtha has been used to extract oils and fats from various substances. The only objectionable feature in the use of this material for this purpose is that it imparts an unpleasant odor to the oil or fat in the process of dissolving out of the substance in which it is contained. This objection is not a serious one in the extraction of oils and fats used for mechanical and some other purposes; but in the extraction of oils which are used for food the objection is a serious one, and to overcome this objection is the purpose of my invention.

It consists in first charging the naphtha with chlorine gas or some equivalent of chlorine gas—such as bromine—and then use the naphtha so charged in dissolving the oil and removing it from the seed or other matrix. Impregnate the naphtha with the gas in the following manner: The naphtha to be treated is put into a suitable tank containing either bromine and water as high therein as from three to six inches, or a suitable chlorine-gas-generating mixture of suitable height. The tank is provided with overflow-openings at different heights, and as the naphtha always remains on top of the said mixtures it is thoroughly impregnated with the gases, and thereby freed from its odor. The generating-mixture must of course be renewed occasionally. This treatment of the naphtha frees it from its objectionable odor without interfering with the proper qualities of the naphtha as a solvent, and I then apply it, charged with the gases, to the seed or other material containing the oil in the ordinary manner.

I claim as my invention—

The hereinbefore-described process of extracting oil, the same consisting in first subjecting naphtha to the action of chlorine or equivalent gas, whereby it is charged with the gases and freed from its objectionable odor, and then applying the naphtha to the substance from which the oil is to be extracted, and dissolving the oil therefrom, substantially as described.

In testimony whereof I have signed my name to this specification in the presence of two subscribing witnesses.

LUDWIG HEINRICH FRIEDBURG.

Witnesses:
ELIAS H. STEVENS,
CHAS. O. GRIM.